US012627126B2

(12) United States Patent
Michael et al.

(10) Patent No.: US 12,627,126 B2
(45) Date of Patent: May 12, 2026

(54) SOLAR CABLE RETENTION CLIPS WITH RESILIENT HOOKS FOR STRUCTURE MOUNTING

(71) Applicant: SHOALS TECHNOLOGIES GROUP, LLC, Portland, TN (US)

(72) Inventors: Dorothy Michael, Portland, TN (US); Steve Ferguson, Portland, TN (US); Joaquin Pereda, Portland, TN (US); Dean Solon, Portland, TN (US)

(73) Assignee: SHOALS TECHNOLOGIES GROUP, LLC, Portland, TN (US)

( * ) Notice: Subject to any disclaimer, the term of this patent is extended or adjusted under 35 U.S.C. 154(b) by 89 days.

(21) Appl. No.: 17/737,247

(22) Filed: May 5, 2022

(65) Prior Publication Data

US 2022/0360059 A1    Nov. 10, 2022

Related U.S. Application Data

(60) Provisional application No. 63/262,848, filed on Oct. 21, 2021, provisional application No. 63/201,587, filed on May 5, 2021.

(51) Int. Cl.
*H02G 3/04* (2006.01)
*F16L 3/10* (2006.01)
(Continued)

(52) U.S. Cl.
CPC .......... *H02G 3/0456* (2013.01); *F16L 3/1033* (2013.01); *F16L 3/127* (2013.01);
(Continued)

(58) Field of Classification Search
CPC ...... H02G 3/32; H02G 3/0456; H01B 7/0045; H02S 40/30; H02S 30/10; F16L 3/1033; F16L 3/127
See application file for complete search history.

(56) References Cited

U.S. PATENT DOCUMENTS 1,982,501 A      11/1934  Douglas
2,942,314 A  *   6/1960   Debner ................. F16B 7/0433
                                                          24/339
(Continued)

FOREIGN PATENT DOCUMENTS

CA            2824260 C      2/2021
CN        102339870 A      2/2012
(Continued)

OTHER PUBLICATIONS

Invitation to pay fees for International Application No. PCT/US2023/015303 mailed May 22, 2023, 2 pgs.
(Continued)

*Primary Examiner* — Sadie White
(74) *Attorney, Agent, or Firm* — MASCHOFF BRENNAN; Paul G. Johnson

(57) ABSTRACT

A cable retention clip can include at least one clip body region defining at least two cable retention channels that are arranged to have parallel channel axes. Each cable retention channel has an inlet opening extending a length of the respective cable retention channel so that each cable retention channel forms a C-shape. Each cable retention channel can be separated from an adjacent cable retention channel by a cable separator member. The cable retention clip can also include at least two elongate resilient pillars that are spaced apart with a gap therebetween. The elongate resilient pillars extend from the clip body region that has the cable retention channels. Each elongate pillar includes a hook at an end that is opposite of the clip body region. Each hook can be oriented away from the other hook, such that both hooks point away from each other.

17 Claims, 13 Drawing Sheets

(51) Int. Cl.

| | |
|---|---|
| *F16L 3/127* | (2006.01) |
| *H01B 7/00* | (2006.01) |
| *H02G 3/32* | (2006.01) |
| *H02S 30/10* | (2014.01) |
| *H02S 40/30* | (2014.01) |

(52) U.S. Cl.
CPC ............. *H01B 7/0045* (2013.01); *H02G 3/32* (2013.01); *H02S 30/10* (2014.12); *H02S 40/30* (2014.12)

(56) References Cited

U.S. PATENT DOCUMENTS

| | | | | |
|---|---|---|---|---|
| D188,323 | S | 7/1960 | Johnson | |
| 3,053,930 | A | 9/1962 | Mallanik et al. | |
| 3,136,515 | A | 6/1964 | Potruch | |
| 3,233,851 | A * | 2/1966 | Lemieux | H02G 3/0437 |
| | | | | D8/394 |
| 3,353,567 | A | 11/1967 | Isreeli | |
| 3,564,668 | A | 2/1971 | Kirk | |
| 3,601,756 | A | 8/1971 | Stroh | |
| D269,851 | S | 7/1983 | Kimura | |
| 4,669,156 | A | 6/1987 | Guido et al. | |
| D296,074 | S | 6/1988 | Seyfarth | |
| D297,813 | S | 9/1988 | Marx | |
| 4,874,908 | A * | 10/1989 | Johansson | H02B 1/202 |
| | | | | 439/402 |
| D331,698 | S | 12/1992 | Pezzoli | |
| D332,401 | S | 1/1993 | Araujo, Jr. | |
| 5,331,725 | A | 7/1994 | Chou | |
| D363,211 | S | 10/1995 | Noble | |
| D375,890 | S * | 11/1996 | Takai | D8/380 |
| D376,309 | S | 12/1996 | Takai | |
| 5,613,655 | A | 3/1997 | Marion | |
| 5,615,852 | A | 4/1997 | Heidorn et al. | |
| D379,060 | S | 5/1997 | Laga | |
| D387,652 | S | 12/1997 | Carlson, Jr. | |
| 5,807,018 | A * | 9/1998 | Peek | H02G 3/26 |
| | | | | 24/297 |
| D406,383 | S | 3/1999 | Adams | |
| 6,227,502 | B1 | 5/2001 | Derman | |
| 6,405,414 | B1 | 6/2002 | Byrnes | |
| 6,477,744 | B1 | 11/2002 | Miles | |
| D482,269 | S | 11/2003 | Martello | |
| 6,802,480 | B1 | 10/2004 | Martello | |
| D503,926 | S | 4/2005 | Marrs | |
| D510,015 | S | 9/2005 | Hostetler | |
| 7,162,836 | B2 | 1/2007 | Van Straaten | |
| D568,254 | S | 5/2008 | Patchett | |
| D581,255 | S | 11/2008 | Calvin | |
| D584,132 | S | 1/2009 | Judd | |
| 7,592,546 | B2 * | 9/2009 | Johansson | H02G 3/03 |
| | | | | 174/95 |
| D637,473 | S | 5/2011 | Mitchell | |
| D640,527 | S | 6/2011 | Hoek | |
| D646,556 | S | 10/2011 | Kelleghan | |
| D657,869 | S | 4/2012 | Mammen | |
| D660,690 | S | 5/2012 | Mixides | |
| 8,541,682 | B2 * | 9/2013 | Mazelle | F01D 25/00 |
| | | | | 174/72 A |
| D704,594 | S | 5/2014 | Cherin | |
| D728,349 | S | 5/2015 | Lake | |
| D729,619 | S | 5/2015 | Cherin | |
| D731,296 | S | 6/2015 | Nelson | |
| D732,422 | S | 6/2015 | Fildan | |
| D733,534 | S | 7/2015 | Altrichter | |
| D753,260 | S | 4/2016 | Solovov, Jr. | |
| D755,043 | S | 5/2016 | Bailey | |
| D784,798 | S | 4/2017 | Logsdon | |
| D791,558 | S | 7/2017 | Carpio | |
| D803,164 | S | 11/2017 | Noble | |
| D803,165 | S | 11/2017 | Noble | |
| 9,903,511 | B2 | 2/2018 | Vermillion | |
| D811,690 | S | 3/2018 | Berte | |
| D815,982 | S | 4/2018 | Chang | |
| D818,391 | S | 5/2018 | Chang | |
| D818,392 | S | 5/2018 | Chang | |
| D824,800 | S | 8/2018 | Blume | |
| D840,795 | S | 2/2019 | Tribbett | |
| D845,168 | S | 4/2019 | Paik | |
| D848,899 | S | 5/2019 | Chang | |
| 10,302,228 | B2 | 5/2019 | Costigan | |
| 10,433,926 | B2 * | 10/2019 | Recanati | A61B 50/20 |
| D896,695 | S | 9/2020 | Falvai | |
| D899,237 | S | 10/2020 | Peck | |
| D906,790 | S | 1/2021 | Ng | |
| 10,978,861 | B2 | 4/2021 | Smith et al. | |
| D928,311 | S | 8/2021 | McVaney | |
| D932,007 | S | 9/2021 | Moudy | |
| D935,349 | S | 11/2021 | Camerlengo | |
| D942,256 | S | 2/2022 | Christiansen | |
| 11,236,858 | B1 | 2/2022 | Rigby | |
| D945,379 | S | 3/2022 | Allender-Zivic | |
| D945,865 | S | 3/2022 | Arnold | |
| D951,069 | S | 5/2022 | Petzl | |
| D951,644 | S | 5/2022 | Camerlengo | |
| D953,147 | S | 5/2022 | Wildes | |
| D957,919 | S | 7/2022 | Bredl | |
| D968,944 | S | 11/2022 | Liu | |
| D970,455 | S | 11/2022 | Xiao | |
| D974,879 | S | 1/2023 | Wu | |
| D975,030 | S | 1/2023 | Atwood | |
| D976,690 | S | 1/2023 | Peng | |
| D977,949 | S | 2/2023 | Li | |
| D981,823 | S | 3/2023 | Hongmeng | |
| D981,825 | S | 3/2023 | Hu | |
| D991,780 | S | 7/2023 | Michael et al. | |
| D996,373 | S | 8/2023 | Michael et al. | |
| D997,106 | S | 8/2023 | Michael | |
| D997,886 | S | 9/2023 | Michael | |
| D997,887 | S | 9/2023 | Michael | |
| D997,888 | S | 9/2023 | Michael | |
| D1,001,082 | S | 10/2023 | Michael | |
| D1,011,174 | S | 1/2024 | Michael et al. | |
| D1,012,042 | S | 1/2024 | Michael et al. | |
| 11,949,373 | B1 | 4/2024 | Jasmin et al. | |
| 12,009,647 | B2 | 6/2024 | Michael et al. | |
| 12,158,229 | B2 | 12/2024 | Michael et al. | |
| 2002/0193001 | A1 * | 12/2002 | Yoshikawa | H01R 13/60 |
| | | | | 439/540.1 |
| 2003/0061690 | A1 | 4/2003 | Finley et al. | |
| 2004/0118798 | A1 | 6/2004 | Spiers et al. | |
| 2005/0001108 | A1 * | 1/2005 | Stigler | F16L 3/223 |
| | | | | 248/68.1 |
| 2005/0120652 | A1 | 6/2005 | Cacciani et al. | |
| 2006/0180716 | A1 * | 8/2006 | Tan | H02G 3/32 |
| | | | | 248/68.1 |
| 2007/0007397 | A1 * | 1/2007 | Nelson | F16L 3/2235 |
| | | | | 248/68.1 |
| 2009/0094799 | A1 * | 4/2009 | Ashel | F16L 3/13 |
| | | | | 24/129 R |
| 2009/0293233 | A1 * | 12/2009 | Ho | F16L 3/223 |
| | | | | 24/571 |
| 2010/0006709 | A1 * | 1/2010 | Bleus | H02G 3/32 |
| | | | | 248/68.1 |
| 2011/0220596 | A1 * | 9/2011 | Cusson | F24S 25/13 |
| | | | | 24/522 |
| 2011/0260011 | A1 | 10/2011 | Yu et al. | |
| 2012/0192925 | A1 | 8/2012 | Grushkowitz | |
| 2014/0053891 | A1 * | 2/2014 | West | F24S 25/65 |
| | | | | 136/251 |
| 2014/0061396 | A1 | 3/2014 | Magno et al. | |
| 2014/0326838 | A1 * | 11/2014 | West | F24S 25/61 |
| | | | | 248/74.2 |
| 2014/0353435 | A1 | 12/2014 | Liu et al. | |
| 2014/0374544 | A1 | 12/2014 | Pearson et al. | |
| 2015/0219248 | A1 | 8/2015 | Lares | |
| 2015/0276093 | A1 * | 10/2015 | Aotani | H02G 3/32 |
| | | | | 248/72 |

(56) References Cited

U.S. PATENT DOCUMENTS

| | | | | |
|---|---|---|---|---|
| 2016/0091116 A1* | 3/2016 | Shoecraft | ............. | H02G 3/0456 211/41.1 |
| 2016/0111996 A1 | 4/2016 | Stephan et al. | | |
| 2016/0258554 A1* | 9/2016 | Ripoll Agullo | ....... | F16L 3/1033 |
| 2016/0282018 A1 | 9/2016 | Ash | | |
| 2018/0019703 A1* | 1/2018 | Almy | ...................... | H02S 30/10 |
| 2018/0080579 A1 | 3/2018 | Costigan | | |
| 2018/0366926 A1 | 12/2018 | Schulte | | |
| 2019/0081469 A1 | 3/2019 | Shea et al. | | |
| 2019/0149087 A1 | 5/2019 | McPheeters et al. | | |
| 2020/0107466 A1 | 4/2020 | Hjelmfelt et al. | | |
| 2020/0366076 A1 | 11/2020 | Naugler et al. | | |
| 2020/0403390 A1* | 12/2020 | Jette | ........................ | H02S 40/30 |
| 2021/0033220 A1 | 2/2021 | Laughlin | | |
| 2021/0184325 A1* | 6/2021 | Wu | .......................... | H01Q 1/12 |
| 2021/0213231 A1 | 7/2021 | Spear | | |
| 2021/0344179 A1* | 11/2021 | Mourieras | ................ | H02G 1/08 |
| 2022/0356963 A1 | 11/2022 | Michael et al. | | |
| 2022/0359102 A1 | 11/2022 | Michael | | |
| 2023/0245798 A1 | 8/2023 | Michael et al. | | |
| 2023/0296192 A1 | 9/2023 | Michael et al. | | |
| 2024/0348026 A1 | 10/2024 | Michael | | |

FOREIGN PATENT DOCUMENTS

| | | | |
|---|---|---|---|
| CN | 110972432 A | 4/2020 |
| EP | 2766966 B1 | 1/2016 |
| GB | 2464680 A | 4/2010 |
| WO | 2018032033 A1 | 2/2018 |
| WO | 2022/235679 A1 | 11/2022 |

OTHER PUBLICATIONS

International Search Report and Written Opinion for International Application No. PCT/US2023/015303 mailed Jul. 28, 2023, 13 pgs.

International Search Report and Written Opinion for International Application No. PCT/US2023/017566 mailed Jun. 27, 2023, 9 pgs.

Invitation to pay fees for International Application No. PCT/US22/27792 mailed Aug. 1, 2022.

International Search Report and Written Opinion for International Application No. PCT/US22/27792 mailed Oct. 5, 2022.

International Search Report and Written Opinion for International Application No. PCT/US22/27483 mailed Aug. 16, 2022.

International Search Report and Written Opinion for International Application No. PCT/US22/27478 mailed Sep. 2, 2022.

International Search Report and Written Opinion for International Application No. PCT/US2024/026319 mailed Sep. 12, 2024, 14 pgs.

Examination Report for Australian Application No. 2022268921 mailed Aug. 2, 2024, 3 pgs.

Examination Report for Australian Application No. 2022268964 mailed Oct. 30, 2024, 3 pgs.

Examination Report for Australian Application No. 2022269586 mailed Aug. 5, 2024, 3 pgs.

New Zealand Search report received Jun. 5, 2025 in related application No. 805317.

Extended European search report mailed Apr. 9, 2025, in European Application No. 22799562.8.

European Search Report mailed Apr. 15, 2025, in European application No. 22799436.5.

European Search report received Apr. 9, 2025 in related application No. 22799562.8.

* cited by examiner

SOLAR CABLE RETENTION CLIPS WITH RESILIENT HOOKS FOR STRUCTURE MOUNTING

CROSS-REFERENCE TO RELATED APPLICATIONS

This patent application claims priority to U.S. Provisional Application No. 63/201,587 filed May 5, 2021 and to U.S. Provisional Application No. 63/262,848 filed Oct. 21, 2021, which provisional applications are incorporated herein by specific reference in their entirety.

BACKGROUND

Field

The present disclosure relates solar panel cable clips with resilient hooks for mounting to support structures and cable channels for receiving, securing and organizing solar panel cables in solar panel installations.

Description of Related Art

Solar power has long been considered a niche utility. It is considered desirable from an environmental and political standpoint, but perhaps not economically feasible for generating enough power to make a meaningful contribution to the grid. However, as the problems associated with our dependence on fossil fuels have become better understood, more attention has been paid to so-called alternative energy such as solar power. This attention has led to significant technological and policy advances, such that solar power is now quite prevalent, and more economically feasible.

Technological advances in the generation of solar energy have occurred in multiple areas, including collector material and structure, and wiring infrastructure. Wiring infrastructure, however, continues to present challenges, particularly in large scale solar photovoltaic (PV) panel array installations. Proper wire management is vital to the health of the PV system. Damaged wire insulation can lead to ground-faults, system downtime and fire. Moreover, PV systems are installed in various geographic locations, and experience extreme weather and environmental conditions. The wiring infrastructure must defy wind and weather conditions for many years and must reliably safeguard various electricity yields. The sheer number of cables associated with a typical PV array installation adds to the difficulty in providing efficient and effective wire management.

In addition, PV modules are often mounted to solar tracking systems and the like via bracket or clamp systems. The PV modules are moved to maximize sun exposure. Thus, it is desirable to orient the cables in a manner that accommodates movement of respective PV modules, and in a manner that avoids entanglement or damage to the cables themselves.

To date, there are inadequate tools available to organize and manage the large number of cables often found within a typical PV array installation. Often, installers are left to using zip ties or the like, which, at best, groups cables in a haphazard manner. Such approaches make it difficult to organize cables with respect to the panels and the panel support structures. Moreover, for purposes of repair and maintenance, this approach requires ties to be cut, and then re-established with new ties, which is time consuming, and can lead to damage to the cables/wires when a zip tie is cut.

The claimed subject matter is not limited to embodiments that solve any disadvantages or that operate only in environments such as those described above. This background is only provided to illustrate examples of where the present disclosure may be utilized.

SUMMARY

In some embodiments, a cable retention clip is provided. The cable retention clip can include at least one clip body region defining at least two cable retention channels that are arranged to have parallel channel axes. Each cable retention channel has an inlet opening extending a length of the respective cable retention channel so that each cable retention channel forms a C-shape. Each cable retention channel can be separated from an adjacent cable retention channel by a cable separator member. The cable retention clip can also include at least two elongate resilient pillars that are spaced apart with a gap therebetween. The elongate resilient pillars extend from the clip body region that has the cable retention channels. Each elongate pillar includes a hook at an end that is opposite of the clip body region. Each hook can be oriented away from the other hook, such that both hooks point away from each other (e.g., outwardly or lateral to the longitudinal axis of each channel). In some aspects, each cable retention channel has the same size. In some aspects, there are four cable retention channels that have the same size. In some aspects, there are six cable retention channels that have the same size.

In some embodiments, the cable retention clip includes the clip body that defines at least a pair of the cable retention channels forming a ω-shape. In some aspects, the inlet openings of the cable retention channels can open towards the elongate resilient pillars. In other aspects, the inlet openings of the cable retention channels open away from elongate resilient pillars.

In some embodiments, the pillars are a same material as the retention clip body and are integrated therewith. The hook of each pillar can include a first hook body portion with a first retention surface extending from a pillar end of the respective pillar, and include a second hook body portion with a second retention surface extending from an end of the first hook body portion. In some aspects, the first retention surface is at an angle with respect to a pillar surface, and the second retention surface is at an angle with respect to the first retention surface. In some aspects, the first retention surface is orthogonal with respect to a pillar surface, and the second retention surface is orthogonal with respect to the first retention surface so as to be parallel with the pillar surface. In some aspects, at least one of the hooks includes a tapered second hook body portion that tapers from the end of the first hook body portion to a second hook tip. In some aspects, each pillar includes: a hook head having the hook; a lower pillar body extending from at least one clip body region; and a recessed pillar body having a recessed surface between the hook head and lower pillar body.

In some embodiments, a cable arrangement can include the cable retention clip of one of the embodiments and at least two solar cables. Each solar cable can be located in the respective cable retention channel of the cable retention clip. The cable arrangement can include a plurality of the cable retention clips. The cable arrangement can also include a plurality of different types of cable retention clips.

In some embodiments, the cable arrangement can include a second cable retention clip that has a second body defining at least two second cable retention channels that are arranged to have parallel channel axes. Each second cable retention channel has an inlet opening extending a length of the respective second cable retention channel so that each second cable retention channel forms a C-shape. Each second cable retention channel can be separated from an adjacent second cable retention channel by a second cable separator. In some aspects, the second body defines at least a pair of the second cable retention channels forming a ω-shape.

In some embodiments, the cable arrangement can include a second cable retention clip that has a second body that defines at least four second cable retention channels with at least two pairs of the at least four second cable retention channels being separated by a branched cable separator. The branched cable separator can have a first branch that forms a first arm of a first pair of second cable retention channels forming the ω-shape. The branched cable separator also has a second branch that forms a second arm of a second pair of second cable retention channels forming the ω-shape. The at least four cable retention channels are arranged to have the parallel channel axes.

In some embodiments, the cable arrangement can include a second cable retention clip that has a second body that defines at least four second cable retention channels with each second cable retention channel being separated by a second cable separator. Two second cable separators have a pair of curved arms and form a first pair of second cable retention channels with one second cable separator having a stubbed central protrusion thereby forming the ω-shape. The at least four second cable retention channels are arranged to have the parallel channel axes. In some aspects, at least one of the second cable retention channels includes a larger size than at least three of the second cable retention channels that have a same smaller size. In some aspects, the outer second cable retention channels form hook shapes that hook toward each other.

In some embodiments, a solar installation includes the cable arrangement of one of the embodiment and at least one solar panel operably coupled with at least one of the solar cables.

In some embodiments, a kit can include at least one cable retention clip of one of the embodiments and at least one second cable retention clip. The second cable retention clip can include a plurality of cable channel conduits. Also, the second cable retention clip can be devoid of a structure coupling feature, and thereby can be referred to as a cable clip.

In some embodiments, a method of arranging solar cables is provided. The method of arranging solar cables can include providing the cable retention clip of one of the embodiments. The method can include applying a force to each hook to press the hooks toward each other and then inserting each hook through an aperture in a structural support. The force can be released from each hook so that the hooks resiliently spread away from each other and hook into the aperture and couple with the structural support. The method can also include inserting at least two cables into at least two cable retention channels. This method results in the cable arrangement, and results in the solar installation when coupled with the solar panel.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
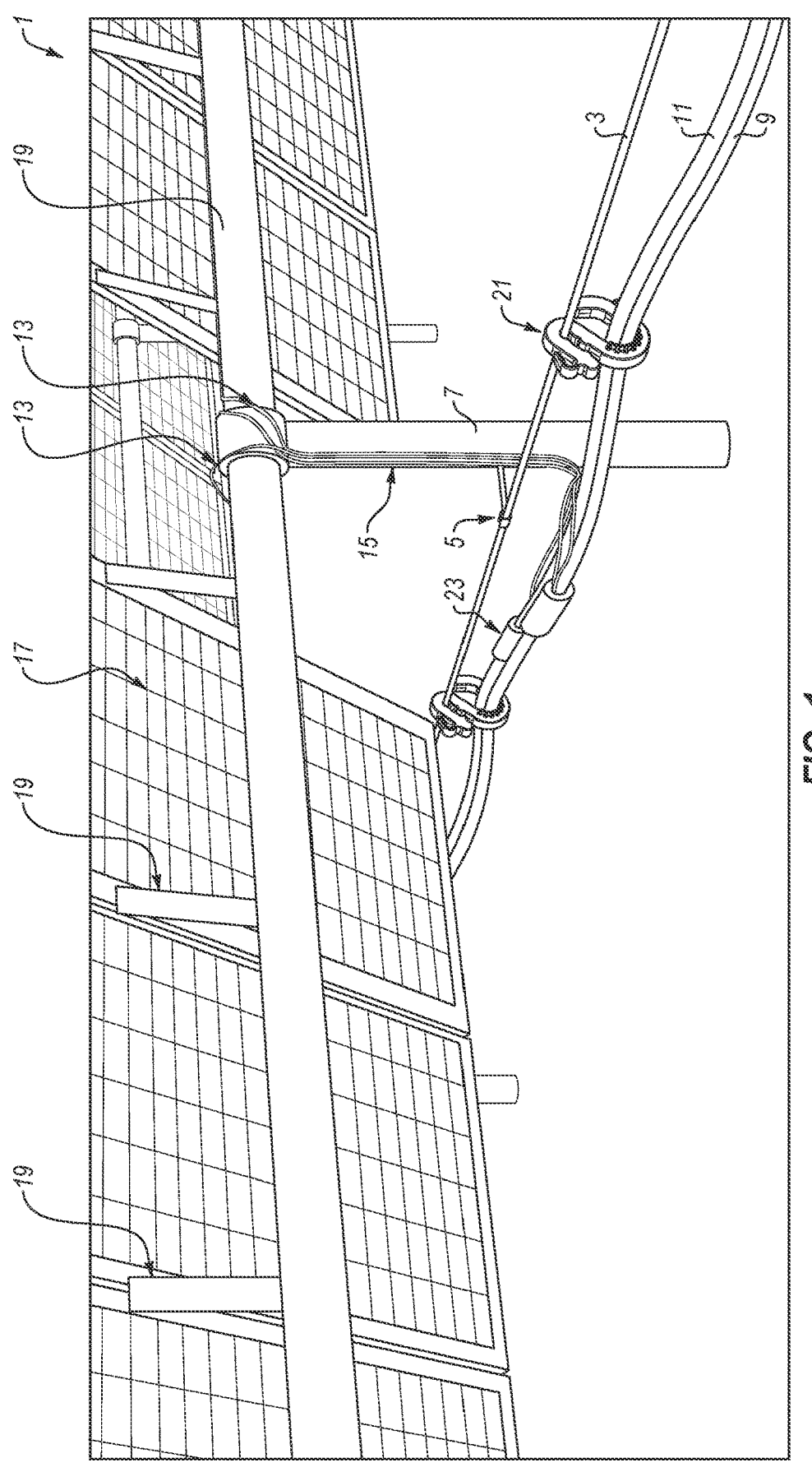
FIG. 1 illustrates an example solar power cable installation that includes a messenger cable coupled to the structural pile and suspending the lead cables.

Reference will be made to the drawings and specific language will be used to describe various aspects of the disclosure. Using the drawings and description in this manner should not be construed as limiting its scope. Additional aspects may be apparent in light of the disclosure, including the claims, or may be learned by practice.

The present disclosure generally relates to cable retention clips and systems suitable for retention and management of solar wire cables (e.g., solar cables) within a photovoltaic (PV) solar panel array installation. Individually, disclosed clip embodiments can be used to retain a plurality of solar cables together in an organized manner, and in a manner that allows for easy installation and/or later repair to the solar cables and/or corresponding solar panels. The solar cable retention clips can be provided for retaining the solar cables together for organization and for holding the cables off of the ground. The solar cable retention clips can have different configurations for retaining different types of solar cables together or for retaining the same type of solar cables together. As such, the solar cable retention clips can have at least two different cable channels with different sizes (e.g., different diameter, circumference, or lumen cross-sectional area) or at least two different cable channels all having the same size. This allows for unique solar cable retention clip systems for retaining and organizing the solar cables.

The cable retention section can include two or more cable retention channels, which each channel being configured to detachably receive a section of a cable associated with the PV solar panel. As such, each channel has a channel opening for normal or lateral pressing of the cable through the channel opening into the channel (e.g., perpendicular to channel longitudinal axis). For example, the cable can be aligned parallel with the axis of the channel, and then pressed through the channel opening into the channel.

In some embodiments, the cable retention clips described herein can include one or more channels adapted for coupling to a big lead assembly (BLA) lead cable and/or coupling to a plurality of secondary cables. In some aspects, there are BLA lead cable channels and secondary cable channels. In some aspects, there are only BLA lean cable channels. In some aspects, there are only secondary cable channels. However, other embodiments can include different numbers of cable channels, such as six cable channels, four cable channels, or two cable channels, or any other integer. This allows for the solar cable retention clip to couple the solar cables to a structural support. As described herein, the solar cables can include electrically conducting wires within an insulation coating, and can be referred to as wire cables. The cable retention clips shown and described herein can have the channel size modified to fit different cable sizes, and thereby the embodiments can be configured for BLA lead cables and/or secondary cables.

FIG. 1 shows an example solar infrastructure 1. FIG. 1 illustrates an example solar infrastructure 1 having a plurality of solar panels 17 mounted to piles 7. The solar panels 17 are mounted to frames 19 that are mounted to the piles 7 for an above ground installation. The example solar infrastructure 1 includes a messenger cable 3 mounted via a hanger arm 5 to the pile 7 installed in the ground. The big lead assembly (BLA) cable BLA red 9 (e.g., positive) and BLA black 11 (e.g., negative) cable hang from the messenger cable 3. A cable hanger 21 is shown to hang from the messenger cable 3 to carry the BLA red 9 and BLA black 11 cables. BLA red 9 and BLA black 11 cables are trunk cables or lead cables that carry the electricity from a group of solar panels 17 to a central component. The panel red 13 (e.g., positive) and panel black 15 (e.g., negative) cables, which are branch wire cables (e.g., secondary cables), are shown to run from the solar panel 17 to the pile 7 (e.g., pile shown as round, but an H-pile can be used). There are junction connectors 23 connecting the panel red cables 13 to the BLA red cable 9 and the panel black cables 15 to the BLA black cable 11. In some embodiments, the present invention provides a cable retention clip that can be used in the solar infrastructure 1, such as to couple the secondary cables to the lead cables hanging from the messenger cable. As such, some of the cable retention clips described herein can be used without a messenger cable.

Figure 2:
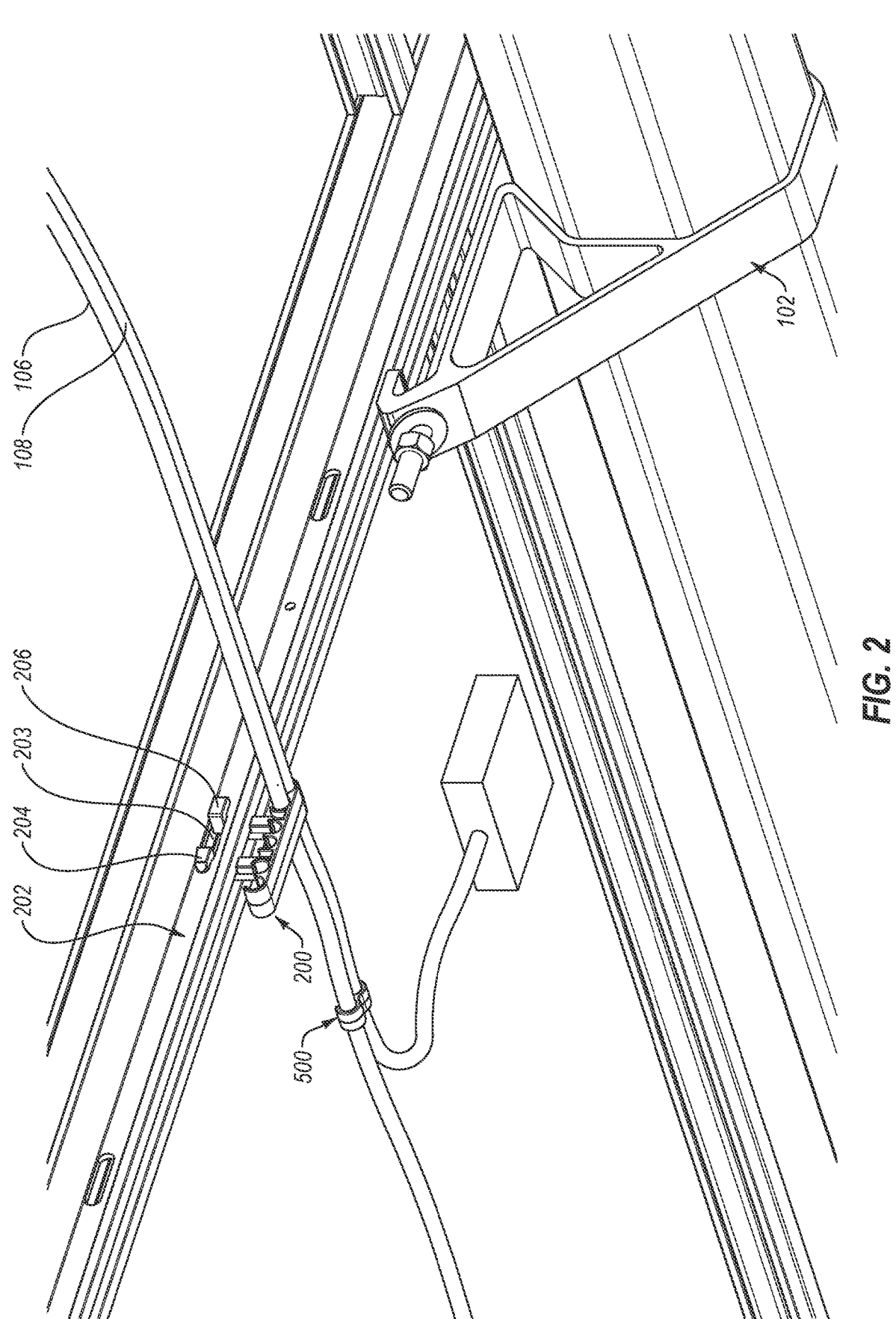
FIG. 2 illustrates another example solar power cable installation that includes an embodiment of a solar cable retention clip with resilient hooks for structure mounting.

FIG. 2 a illustrates one example of an embodiment of a representative cable retention clip 200 attached to a PV module frame of a solar panel installation (e.g., FIG. 1). In this embodiment, the cable retention clip 200 is configured to attach directly to a railing, denoted at 202, of a PV solar panel installation. The railing 202 is an example of a structural support member. The railing 202 can include an aperture 203 adapted to receive two resilient hook members 204, 206. However, any structural component, such as a bracket 102, which includes an aperture 203 can be used to retain the cable retention clip 202 by receiving the two resilient hook members 204, 206 that hook onto the sides of the aperture 203 and resiliently grip the walls of the aperture 203. Specifically, in one embodiment, the cable retention clip 200 may include two resilient hook members 204, 206 that extend through an aperture 203 formed in the railing 202 of the solar panel installation. In this way, the retention clip 200 can be used to further retain and manage solar cables in the region of the solar panel itself, in addition to (or in lieu of) support at the bracket 102 or other structural support member. Any structural support member with one aperture or two suitably spaced apart apertures, which are dimensioned for receiving the two resilient hook portions 204, 206 can be used to receive the cable retention clip 200.

FIGS. 3A-3E illustrates the retention clip 200. The retention clip 200 includes a cable retention section 210. The cable retention section 210 includes one or more cable retention channels, shown here at 212, 214, 216, 218, 220 and 222. As such, the cable retention section 210 can be a cable channel member. However, there can be 2, 4, or even 8 or more channels, which may be oriented to open toward the two resilient hook member 204, 206 (as shown), or downward and away from the two resilient hook members 204, 206 (opposite orientation as shown). The configuration of the cable channels 212, 214, 216, 218, 220 and 222 allows for the cables (two of which are shown at 106, 108 in FIG. 2) to be detachably secured with respect to a solar panel at the rail 202, thereby allowing for easy installation and repair. Moreover, securing the cables in this manner ensures orderly cable management, thereby avoiding damage and entanglement—particularly in the case where the panels/bracket are moveable, such as in a solar tracker application.

Each retention channel 212, 214, 216, 218, 220 and 222 provides a cable receiving portion having a suitable 'C' shape, so as to receive and retain in a detachable manner a corresponding cable. Each retention channel includes an adequate opening, denoted here at 213, 215, 217, 219, 221 and 223, to detachably receive and "clamp" a corresponding cable. These openings 213, 215, 217, 219, 221 and 223 can be configured as slots into the lumen along the full length of the channel (e.g., parallel with longitudinal axis of channel), end to end. The size (e.g., the diameter, circumference, lumen cross-sectional area, etc.) of a given retention channel will depend on the size of the outer circumference of a given cable (e.g., typically dictated by the gauge of the cable). Similarly, the dimensions of a given retention channel opening are such so as to form a slot to receive the cable therethrough into the lumen in a manner to adequately retain it in the lumen, and yet allow its removal from the lumen if needed. The retention ability can be enhanced depending on the material used for the clip 200. For example, a resilient plastic material or the like enables a "clip' effect, so as to allow some expansion of the channel opening to accommodate insertion of the cable by way of a pressing force on the cable into the retention channel opening. Once the cable is inserted, the retention channel can slightly retract to its original shape, thereby retaining the cable within a given retention channel. In addition, the flexibility of the outer surface of a given cable may also be utilized to facilitate insertion and detachable retention within a given retention channel—e.g., the outer surface, such as deformable plastic, contracts slightly to allow insertion via a channel opening and, once inserted, slight expansion allows the cable to be resiliently and detachably retained within the channel. Disposed between each retention channel is a cable separator portion, such as is denoted at 225. This maintains adequate separation between adjacent cables, further ensuring against inadvertent shorts, for example.

The example cable retention clip 200 also includes a rail retention portion denoted at 248. The rail retention portion can include the two resilient hook members 204, 206. As such, the rail retention portion 248, can be a structure hooking feature 201. The rail retention portion 248 can be formed integrally (for example, utilizing a suitable molding process if plastic) with the cable retention section 210 or can be formed as two (or more) distinct pieces that are attached. As is shown, in one example the rail retention portion 248 defines two pillar sections, denoted at 205 and 207. Disposed at the ends of each pillar section are resilient hook portions, denoted at 204 and 206.

Figure 3A:
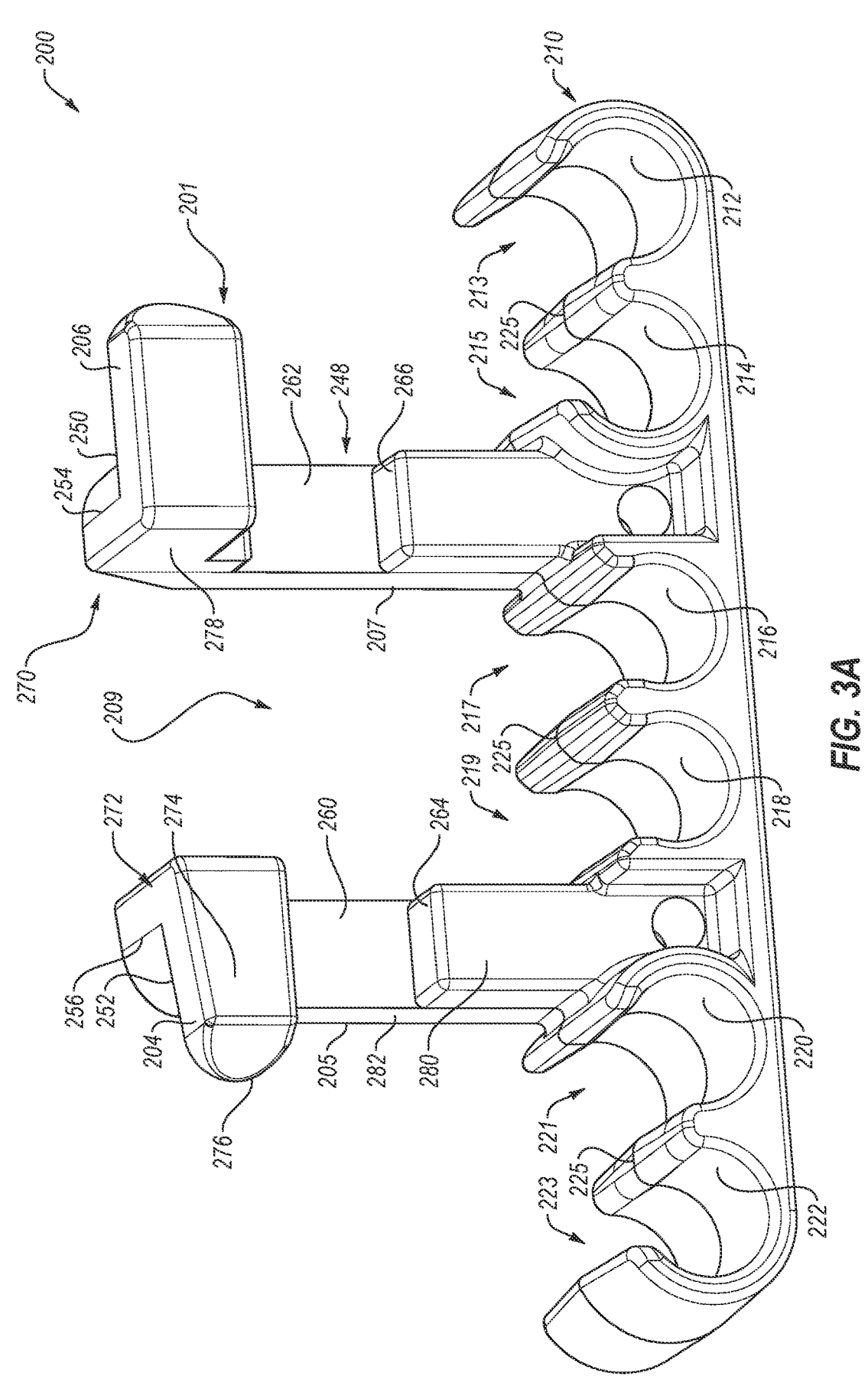
FIG. 3A is a front perspective view of an embodiment of a solar cable retention clip with resilient hooks for structure mounting.
Figure 3B:
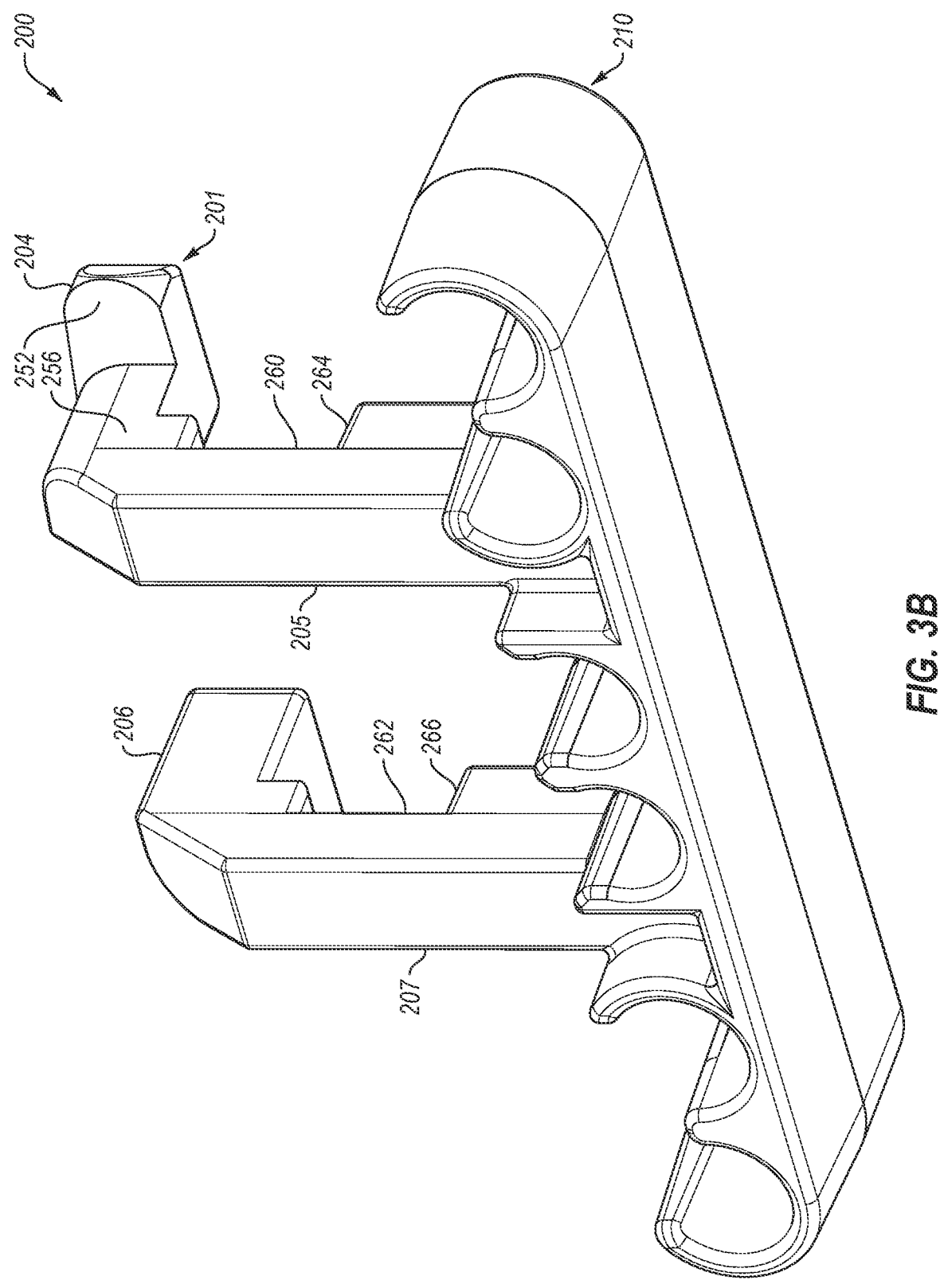
FIG. 3B is a back perspective view of the solar cable retention clip of FIG. 3A.

As can be seen in FIG. 3A, each hook 204, 206 includes retention surfaces 250 and 254 for hook 206, and retention surfaces 252 and 256 for hook 204. The retention surface pairs 250, 254 and retention surface pairs 252, 256 are cooperatively sized and shaped to extend through the aperture 203 formed on the rail 202 of a panel (FIG. 2) and engage corresponding surfaces of the aperture 203. Retention surfaces 250 and 252 can each have a plane that is in the same plane, which plane can be perpendicular to an axis of each cable retention channel 212, 214, 216, 218, 220, 222. Also, the retention surfaces 250 and 252 can be perpendicular to retention surfaces 254, 256. The retention surfaces 254, 256 apply a force laterally away from each other when resiliently engaged to an aperture 203.

Further, in the embodiment shown, each pillar 205 and 207 includes recessed surfaces 260 and 262 that are configured to abut and be supported by a corresponding surface of the panel rail 202. Further, support surfaces 264 and 266 are provided, which also can rest on a support surface provided by the rail 202 when the hooks 204, 206 extend through the aperture 203.

Figure 3C:
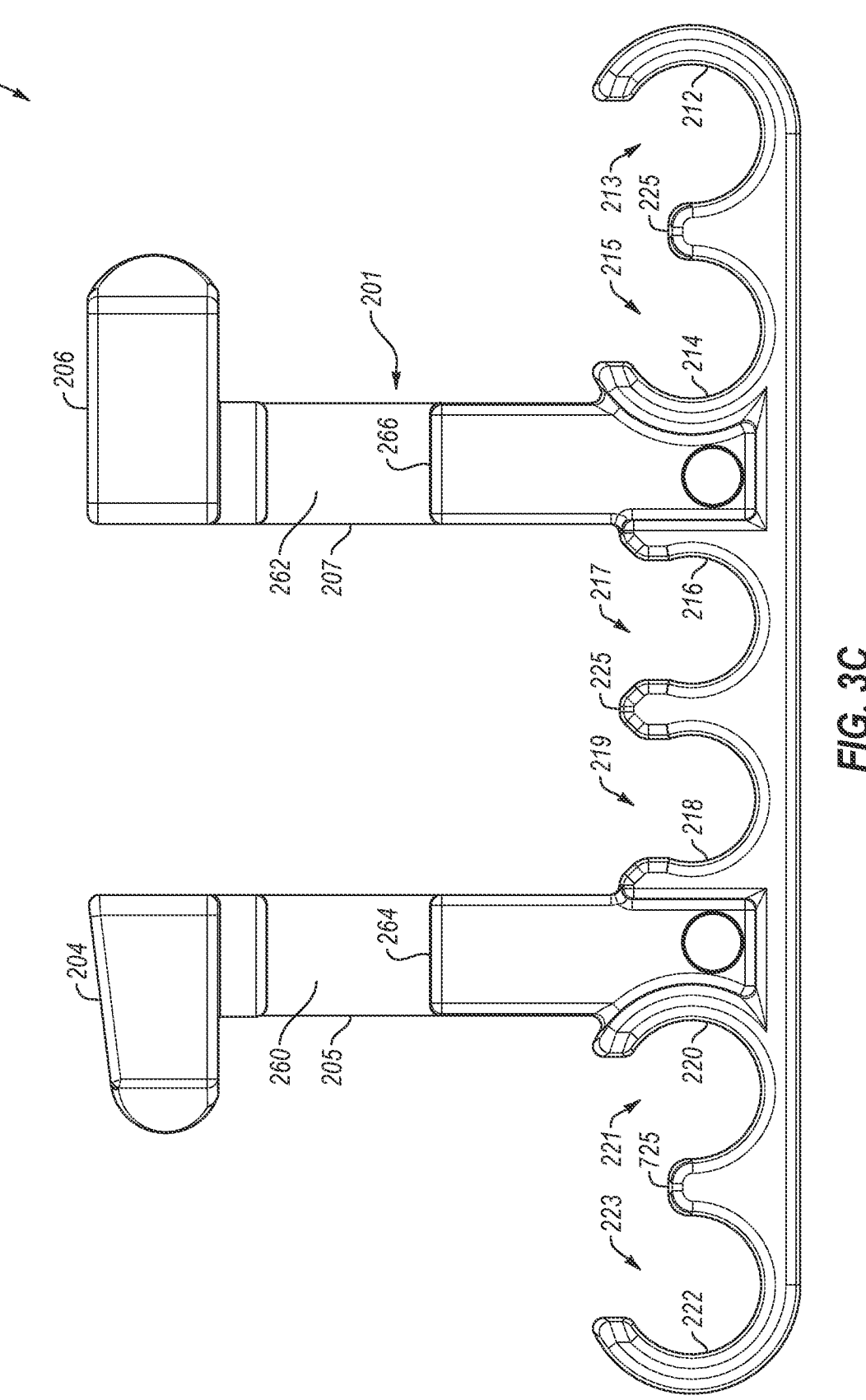
FIG. 3C is a front view of the solar cable retention clip of FIG. 3A.
Figure 3E:
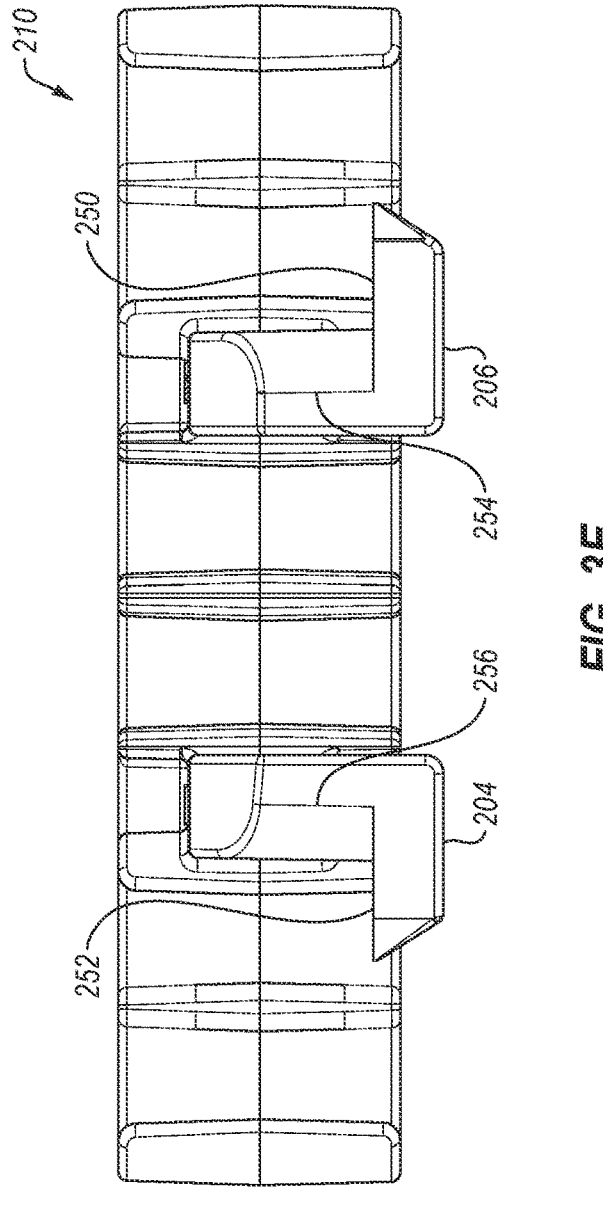
FIG. 3E is a top view of the solar cable retention clip of FIG. 3A.
Figure 3D:
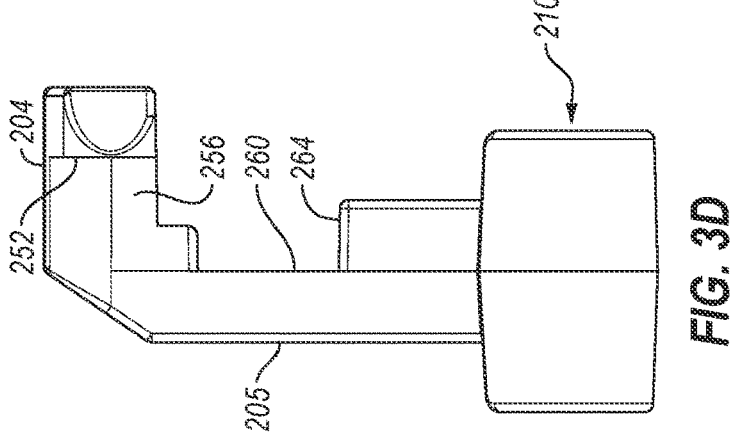
FIG. 3D is a side view of the solar cable retention clip of FIG. 3A.

In one embodiment, the pillars 205 and 207 are resilient (can bend) so as to allow insertion of the hooks 204, 206 through the aperture 203. When released, each pillar 205 and 207 may deform toward an original position so that at least the retention surfaces 254, 256 apply force to the opposite sides of the wall(s) of the aperture 203, thereby engaging the structure within the aperture 203, and thereby detachably engaging the retention clip 200 with the panel rail 202. In this way, the retention clip 200 is detachably fastened to the rail 202, thereby maintaining the cables in a desired relative fashion to the panel yet allowing for removal and/or reattachment when needed. FIGS. 3C-3E show additional views of the retention clip 700.

Referring to FIG. 2 in view of FIGS. 3A-3E, the cable retention clip 200 can be used in a method of securing cables to a support structure. The method can include the following steps. Step 1, apply a force to each hook 204, 206 so that the hooks are pressed toward each other, thereby bringing retention surfaces 254 and 256 towards each other. Step 2, insert the hooks 204, 206 through an aperture 203. Step 3, position the hooks 204, 206 so that the pillars 205, 207 are properly positioned for engagement relative to the aperture 203. Step 4, release the force from both hooks 204, 206 so that the retention surfaces 254 and 256 move away from each other and engage with a surface of the aperture 203. The engagement of the cable retention clip 200 to the support structure can be performed with cables within the cable retention channels, or without any cables in the cable retention channels. The cables can be inserted by aligning each cable with a corresponding slot opening of the corresponding channel, and pressing the cable into the channel with a force that is perpendicular to a longitudinal axis of the channel.

Figure 4A:
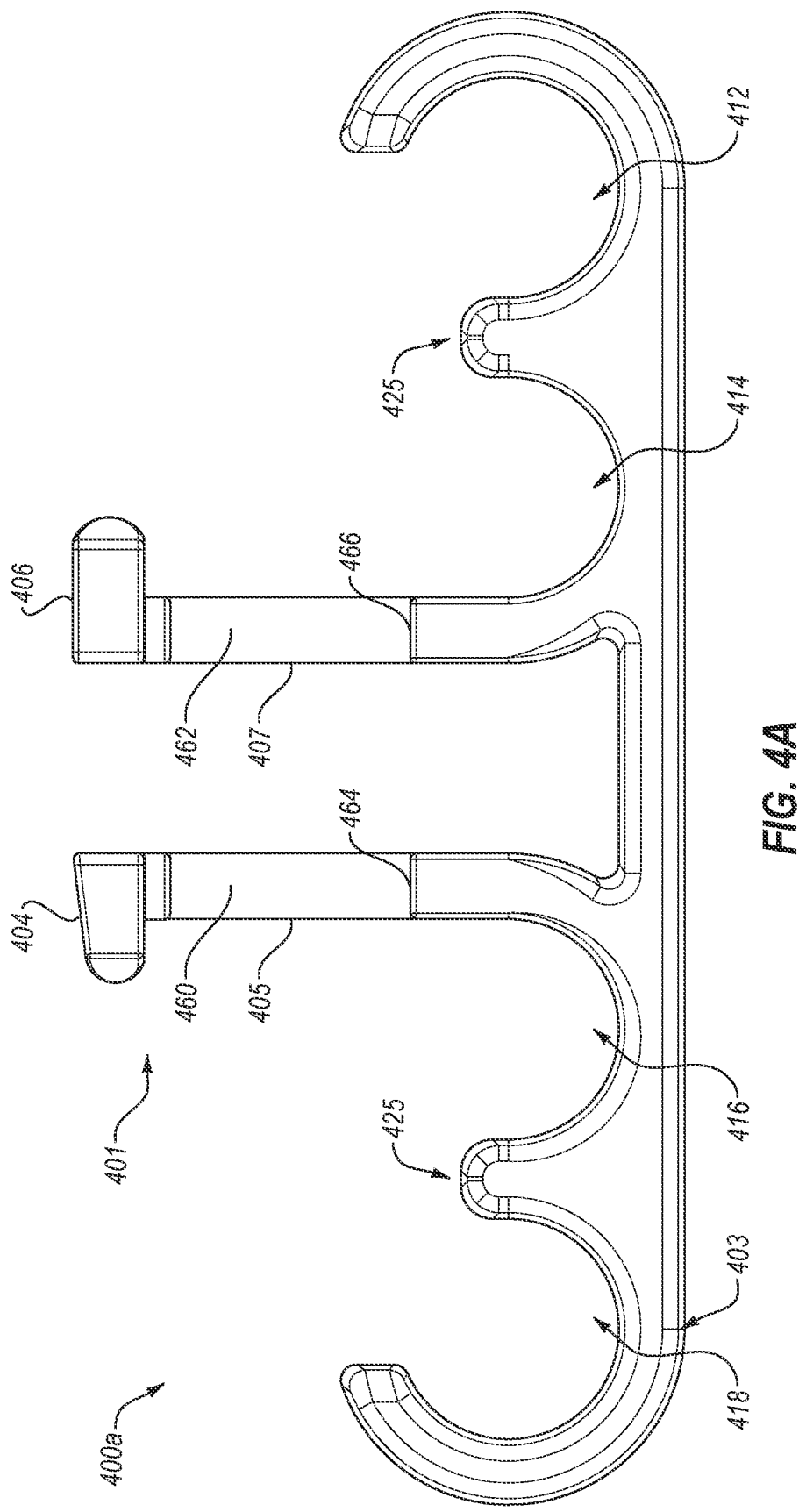
FIG. 4A is a front view of another embodiment of a solar cable retention clip with resilient hooks for structure mounting.

FIG. 4 shows another embodiment of a cable retention clip 400a having resilient hooks 404, 406 on the pillars 405, 407 in the structure hooking feature 401. The pillars 405, 407 include recessed surfaces 460 and 462 that are configured to abut and be supported by a corresponding surface of the panel rail 202. Further, support surfaces 464 and 466 are provided, which also can rest on a support surface provided by the rail 202 when the hooks 404, 406 extend through the aperture 203.

The pillars 405, 407 are resilient and can bend so as to allow being pressed together for insertion of the hooks 404, 406 through the aperture 403. When released, each pillar 405 and 407 may retractably deform toward an original position so that at least the retention surfaces apply forces to the opposite sides of the wall(s) of the aperture 203, thereby engaging the structure within the aperture 203, and thereby detachably engaging the retention clip 400 with the panel rail 202, as shown in FIG. 2.

Additionally, the clip portion 403 includes the retention channels 412, 414, 416, 418, where each provides a cable receiving portion with an opening, so that the cross-sectional profile has a suitable 'C' shape, so as to receive and retain in a detachable manner a corresponding cable. The retention channels 412, 414, 416, 418 are each separated by separating member 425, configured as protrusion to form part of the C-shape. Each retention channel includes an adequate opening formed as slot into the lumen of each channel, and is configured as described for the cable retention clip 200 of FIGS. 3A-3E.

Figure 4B:
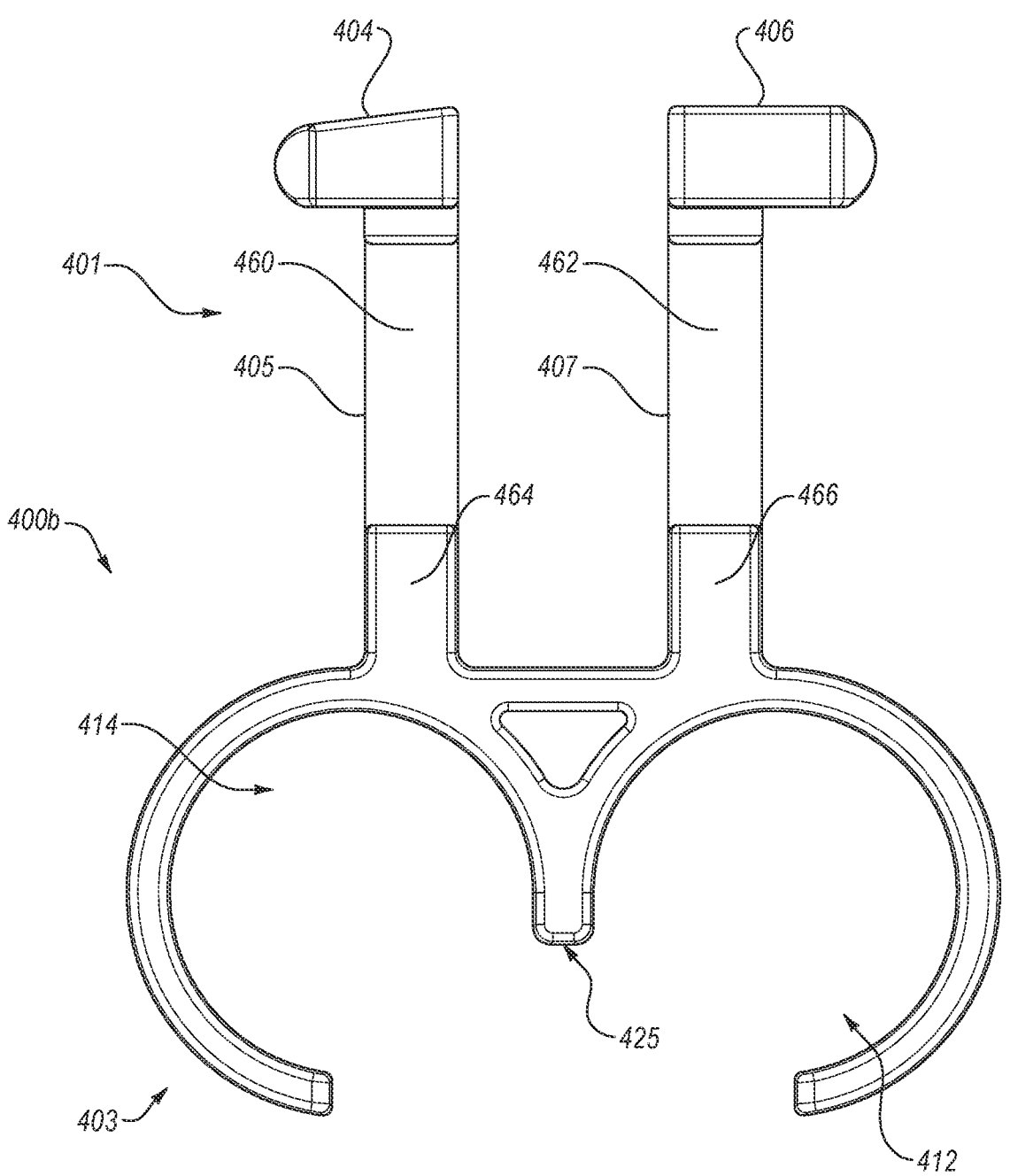
FIG. 4B is a front view of another embodiment of a solar cable retention clip with resilient hooks for structure mounting.

FIG. 4B shows another embodiment of a cable retention clip 400b, which has the two cable retention channels 412, 414 of the clip portion 403 oriented oppositely, so as to have the opening oriented away from pillars 405, 407 and hooks 404, 406 of the structure hooking feature 401. As such, the number of cable retention channels and the orientation of the opening slot can be modified for different embodiments.

Additionally, the solar cable installation may have a plurality of solar cables that need to be retained and organized. Accordingly, additional cable retention clips can be used for cable management, which retain the cables together but do not couple to a structure. For example, the span between structural members may have a plurality of cables therebetween, which may be difficult to organize. Accordingly, the additional cable retention clips that couple the cables together can manage the cables so that they do not hang unevenly or look unsightly.

Figure 5:
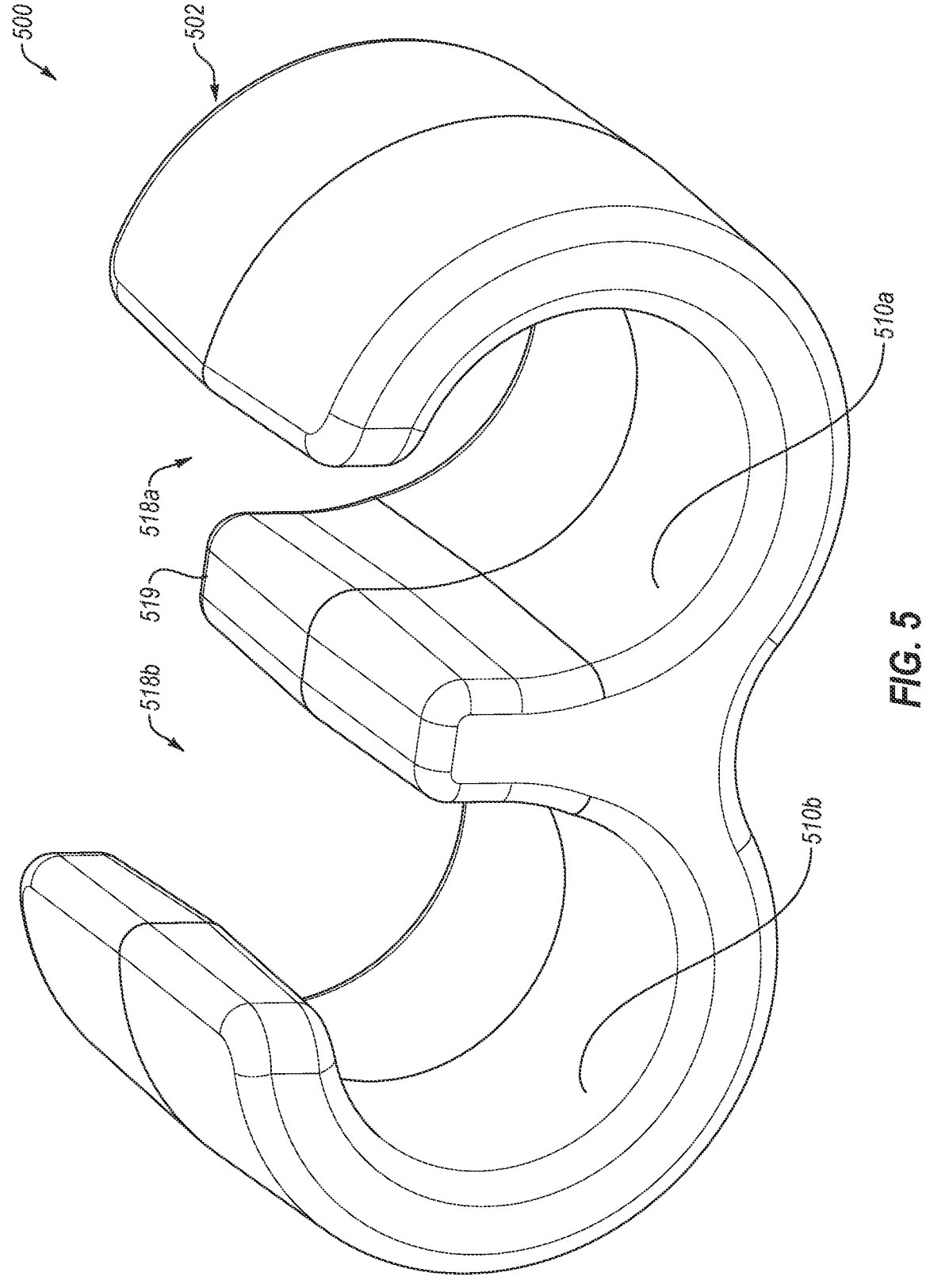
FIG. 5 is a perspective view of another embodiment of a solar cable retention clip for use in a solar power cable installation, as shown in FIG. 2.

FIG. 5 illustrate an embodiment of a solar cable retention clip 500 that retains two solar cables together, which was previously shown in FIG. 2. As noted, the cable retention clip 500 may be used in the cable management system so as to maintain connection and grouping between selected pairs (or more) of cables, such as 106, 108 of FIG. 2 showing the solar cable retention clip 500. As with the retention clip 200, the example cable retention clip 200 includes a clip body portion, denoted at 502, defining one or more clip cable retention channels, two of which are shown in the example at 510a and 510b. Each channel 510a,b is separated by a cable separator portion 519.

As is shown in the example of FIG. 5, each cable retention channel 510a,b provides a clip cable receiving portion having a suitable shape—here a 'C' shape—so as to receive and retain in a detachable manner a corresponding cable. Each clip retention channel 510a,b includes an adequate opening, denoted here at 518a and 518b to detachably receive and "clamp" a corresponding cable. The size (e.g., the diameter, etc.) of a given cable retention channel 510*a,b* will depend on the size of the outer circumference of a given cable (or gauge of the cable). Similarly, the dimensions of a given clip retention channel opening 518*a,b* is such so as to receive the cable in a manner to adequately retain it, and yet allow its removal if needed. The material of the solar cable retention clip 500 can be as described for the cable retention clip 200. While the embodiment of the cable retention clip 500 described above illustrates an implementation that provides support and alignment of two equally sized (gauges) of cable, it will be appreciated that embodiments could be provided that support more than two cables, and/or that provide support for cables of different sizes (gauges).

Figure 6A:
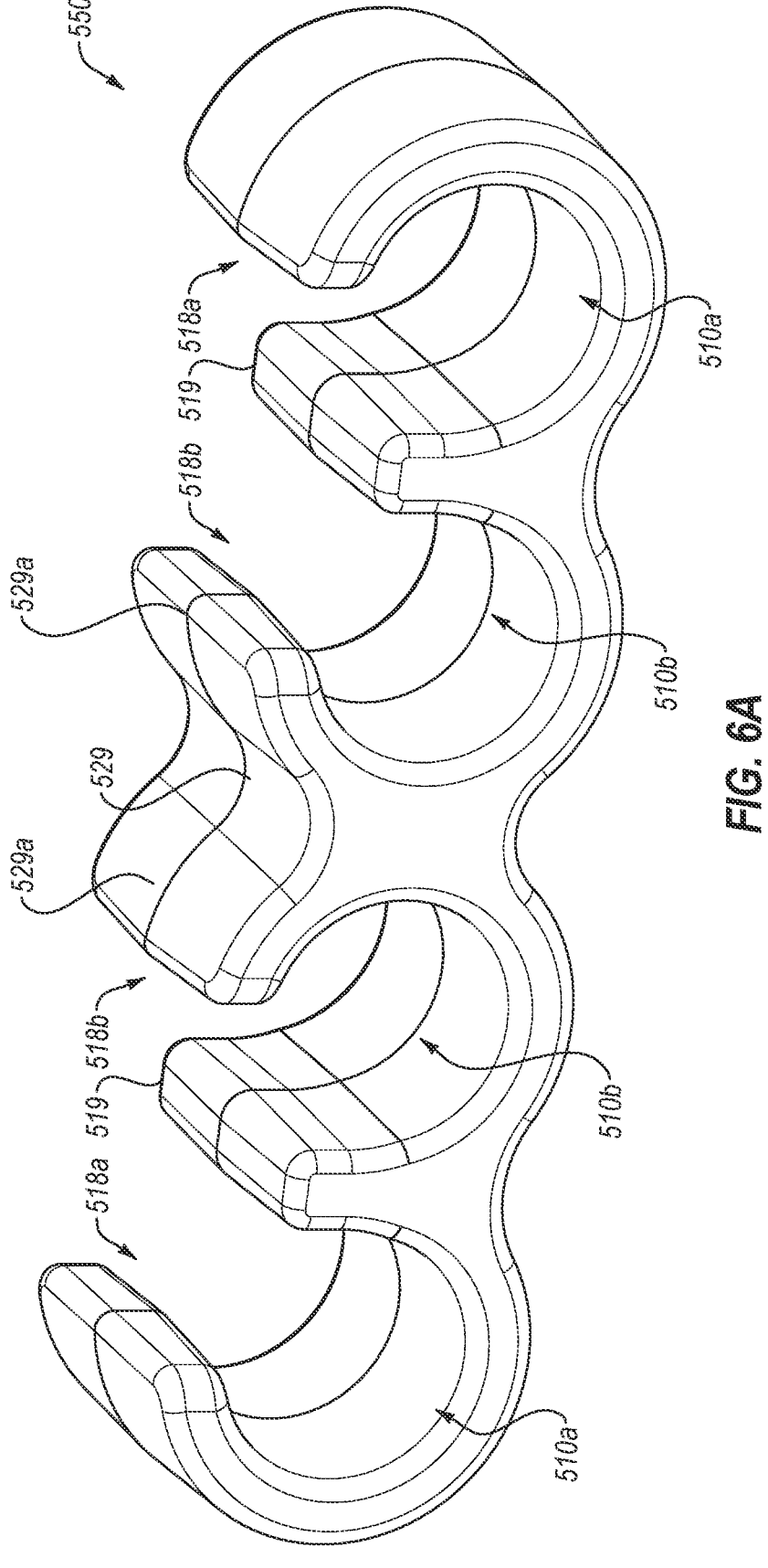
FIG. 6A is a perspective view of another embodiment of a solar cable retention clip for use in a solar power cable installation.
Figure 6B:
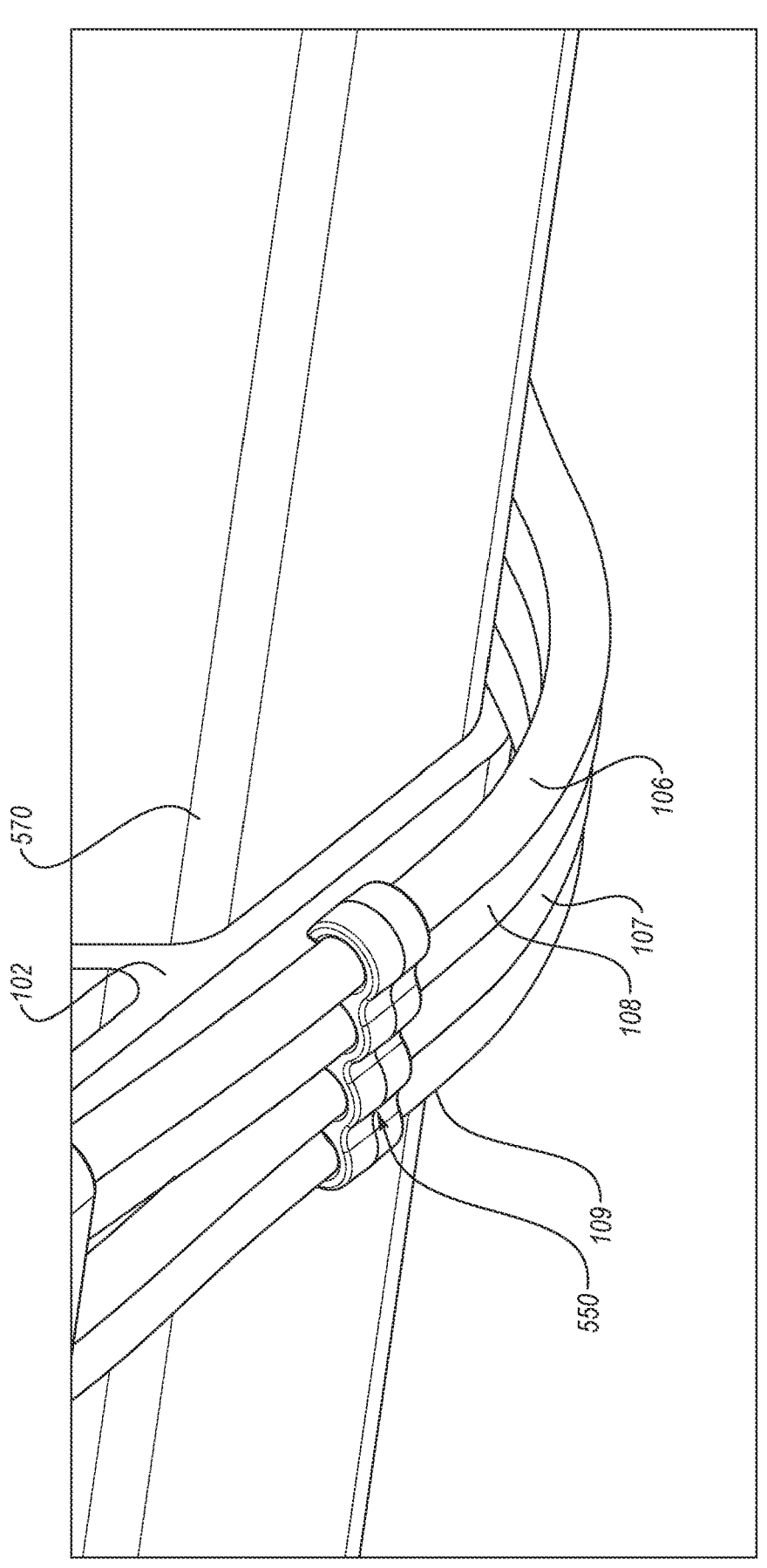
FIG. 6B illustrates another example solar power cable installation that includes the solar cable retention clip of FIG. 6A.

FIGS. 6A-6B illustrate another example of a solar cable retention clip 550. The cable retention clip 550 is similar to the cable clip 500 of FIG. 5, except that additional cable retention channels are provided—here a total of four. It will be appreciated that any number of cable retention channels can be provided based on the needs of a given application. Details regarding the cable clip 550 are shown in FIGS. 6A-6B, all of which are similar to those already described in connection with the cable clip 500 of FIG. 5, and will not be repeated here. Additionally, the cable retention clip 550 can include two pairs of channels, which channels are laterally arranged around a center separating member 529. The separating member 529 can include two wings 529*a* for the members of the pair of channels. The two wings 529*a* help form the shape of the inner channels 510*b*.

FIG. 6B illustrates a solar installation having a support structure (e.g., beam) 570 having a bracket 102 mounted thereto. The solar cable retention clip 550 is shown to clip to and organize the solar cables 106, 107, 108, and 109 in an aligned and parallel organization. Accordingly, the solar cable retention clip 550 can be used to in any solar cable installation, such as with any of the other embodiments of solar cable retention clips and systems.

Figure 7A:
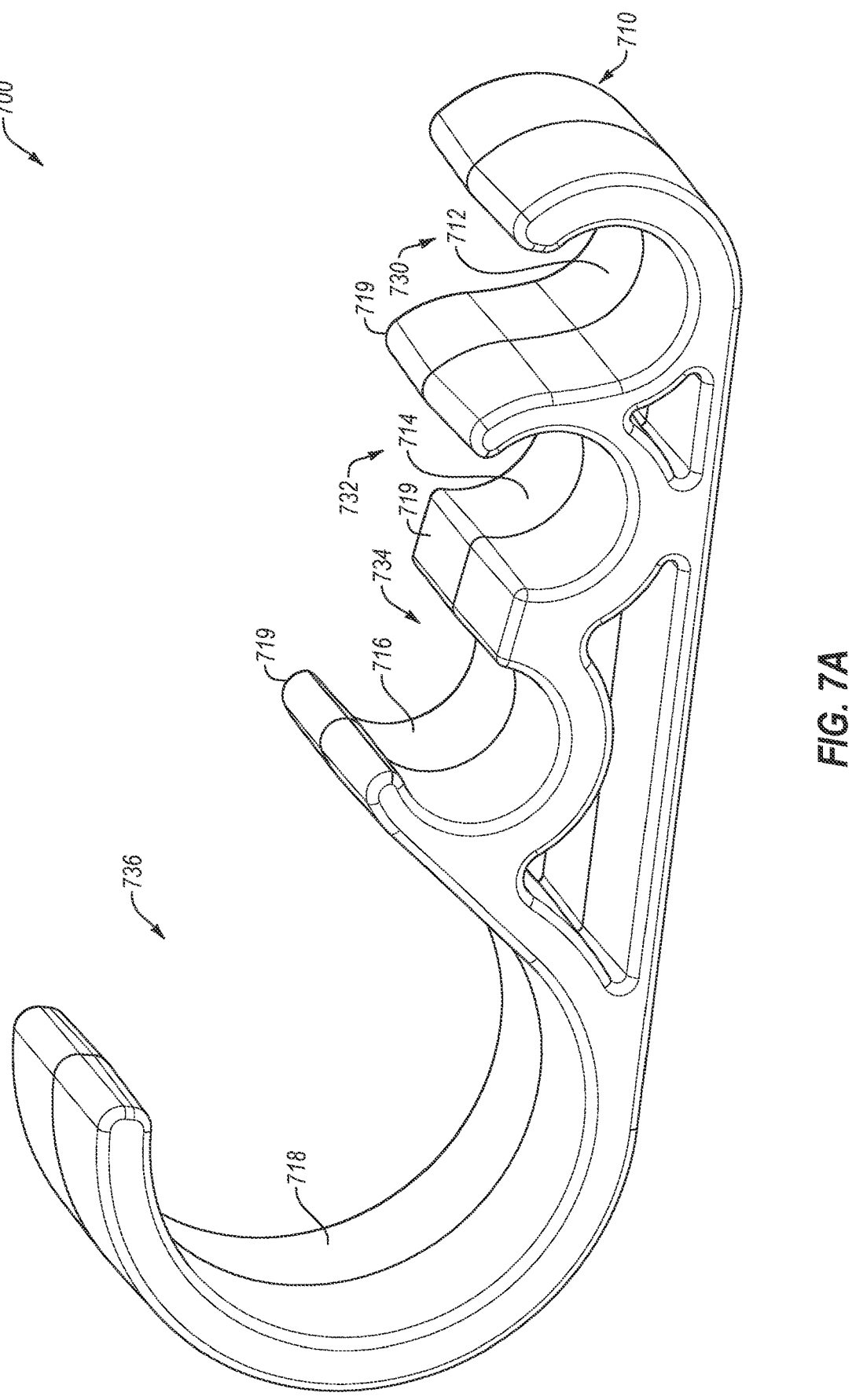
FIG. 7A is a perspective view of another embodiment of a solar cable retention clip for use in a solar power cable installation.
Figure 7B:
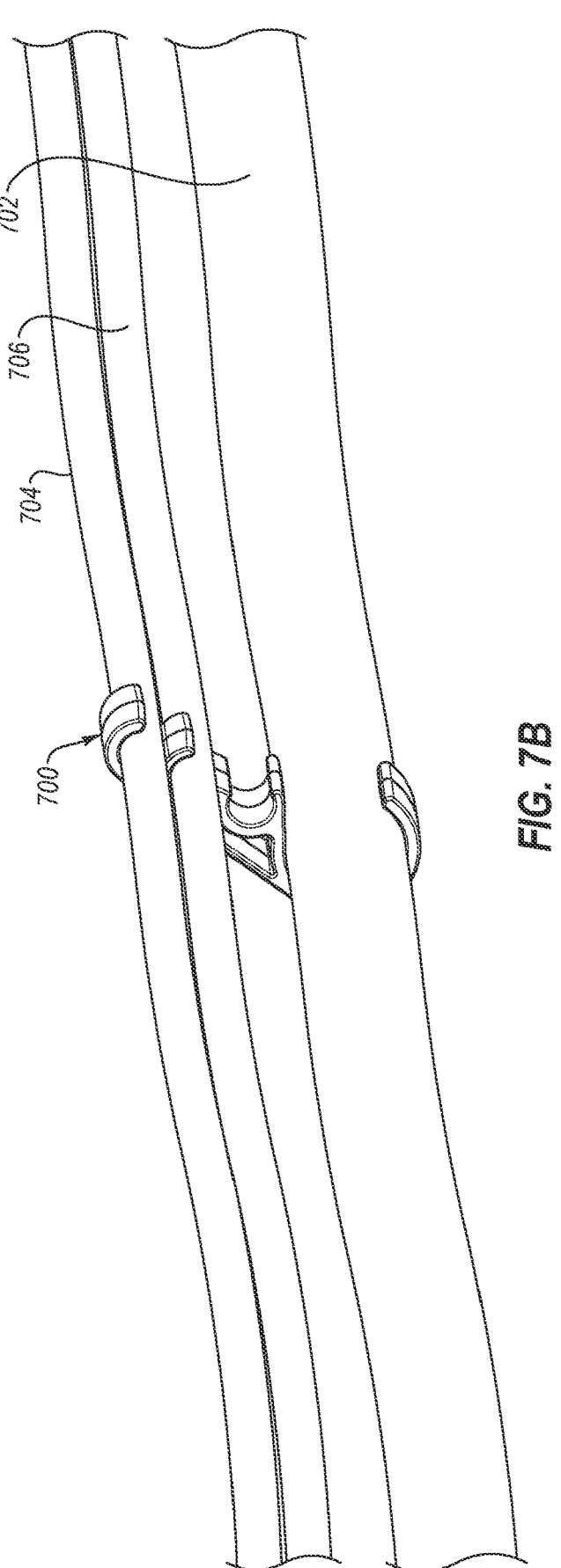
FIG. 7B illustrates another example solar power cable installation that includes the solar cable retention clip of FIG. 7A.

FIGS. 7A-7B illustrate another embodiment of a solar cable retention clip 700. Specifically, FIG. 7A illustrates a cable retention clip, denoted at 700, that is configured to have four cables, with at least one of the cables having a larger outer diameter (gauge) than the other cables. Of course, other combinations of sizes and cable numbers can be provided. As with the cable clips 500 and 550 described previously, the cable clip 700 includes a clip body portion, denoted at 710, defining one or more clip cable retention channels, four of which are shown in the example at 712, 714, 716 and 718. Each channel 712, 714, 716 and 718 is separated by a cable separator portion, denoted here at 719. Each cable retention channel provides a cable receiving portion having a suitable shape—here a 'C' shape—so as to receive and retain in a detachable manner a corresponding cable, which can be configured similarly to the other cable channels of the other embodiments of the solar cable retention clips provided herein. Each clip retention channel includes an adequate opening, denoted here at 730, 732, 734 and 736 to detachably receive and "clamp" a corresponding cable. The size (e.g., the diameter, circumference, lumen cross-sectional area, etc.) of a given clip retention channel will depend on the size of the outer circumference of a given cable (or gauge of the cable). Similarly, the dimensions of a given clip retention channel opening 730, 732, 734 and 736 is such so as to receive the cable in a manner to adequately retain it, and yet allow its removal if needed. For example, cable channel 718 can have a cable channel opening 736 dimensioned for a BLA cable, and the other cable channels 712, 714, and 716 include openings 730, 732, and 734, respectively, that are dimensioned for smaller secondary solar cables. The material of the cable retention clip 700 and other features thereof can be the same as described in connection with the other embodiments of cable retention clips described herein.

FIG. 7B shows the cable retention clip 700 coupled to a BLA cable 702 and two of the possible three secondary solar cables 704 and 706. The third secondary solar cable could be added to the open cable channel if needed or desired. Accordingly, the solar cable retention clip 700 can be used to in any solar cable installation, such as with any of the other embodiments of solar cable retention clips and systems In example embodiments, the cable retention clips include a plastic material, and may exhibit resilient properties to enhance engagement with the cables as discussed above. In some embodiments, the clip is non-conductive, which may be advantageous in the event of an electrical short in a cable, for example. In embodiments, the material(s) used are also resilient to severe environmental conditions (cold, heat, humidity), so as to be able to withstand varying weather conditions present in a typical solar installation The body of the clip can include both pieces being formed of a same resiliently deformable material, wherein the material is selected from a metal coated with an insulation layer, a non-conducting plastic, or combinations thereof.

In some embodiments, a cable retention clip is provided. The cable retention clip can include a first body portion and a second body portion. The first body portion can be shaped to define a plurality of cable retention channels that are positioned adjacent with each other. Each cable retention channel has a parallel channel axis, which is parallel with each other. Each cable retention channel includes an inlet opening extending a length of each cable retention channel, which is a slot into the lumen. The first body portion has a base side that is opposite of each inlet opening. The second body portion can define a pair of resilient elongate pillars with end hooks, with the hooks oriented away from each other. A gap can be present between the pair of resilient elongate pillars, which allows the elongate pillars to be pressed toward each other for placement into an aperture.

The first body portion is coupled to the second body portion such that each first inlet opening opens in a direction toward the elongate hooks. The coupling can be by any joining, such as by being adhered together, welded or brazed, or integrated by being formed of the same material. Injection molding can be used to form the first body portion and second body portion joined together.

In some embodiments, the cable retention clip can have each first inlet opening of each first cable retention channel being opened to form a first common inlet opening region for the pair of first cable retention channels. Also, there can be at least a pair of second cable retention channels that have second inlet openings that form a second common inlet opening region for that pair of second cable retention channels.

In some embodiments, the cable retention clip can include a first body portion that is a planar body and the second body portion is a planar body. The first planar body and second planar body can be on a common plane.

In some embodiments, the cable retention clip can include the first body being formed by at least two connected C-shaped arms connected together at a first separating region of the first body that is positioned at least partially between the pair of first cable retention channels. This can form the ω shape for a pair of cable retention channels. In some aspects, the second body has two elongate pillars with outwardly pointing hooks. In some aspects, the first body and second body are formed of a same resiliently deformable material, wherein the material is selected from a metal coated with an insulation layer, a non-conducting plastic, or combinations thereof. At least two of the channels can be in a pair with the ω shape.

In some embodiments, the cable retention clip can be configured as follows with the first body and the second body. The first body can define a plurality of cable retention channels that are positioned adjacent to each other. Each cable retention channel is dimensioned to retain a lead cable therein. Each cable retention channel can be formed by a curved arm extending from a separating region of the first body that is at least partially between the pair of cable retention channels. Each curved arm can form a cable channel opening by having a channel gap between an end of the curved arm and an end of the separating region. Also, a common gap is between each curved arm end that forms an inlet region for both of the cable retention channels in the pair.

In some embodiments, the cable retention clip can have various configurations. In some aspects, a pair of cable retention channels forms a ω shape. In some aspects, at least two pairs of cable retention channels both form a ω shape.

In another embodiments, a mounting bracket may be used to support a PV solar panel (not shown) via a clamp, rail, H-pile, I-beam, cross-beam, and/or other combinations of structural components as well as PV components. As is known, electrical power generated by a PV solar panel in the form of direct current (DC) generated by a solar panel is conducted to combiner boxes, inverters and the like (not shown) by way of one or more cables. Depending on the nature of the solar installation, there can be a large number of PV solar panels, resulting in a large number of cables. Thus, in a typical installation, many cables need to be oriented, routed and managed.

The flow of energy is harvested by the solar panels, which are passed to junction boxes, where wire harnesses can be used. The solar energy installation can also include recombiner boxes, inverters (DC to AC), transformers, and a switch yard. Each solar panel is connected to a junction box, which may be integrated or separate. Each junction box is in communication with one branch of a wire harness, typically with 6-12 branches, and 12 branches per wire harness being preferred. Each wire harness has one trunk, which is in communication with a recombiner box. For example, a harness can include a plurality of branches feeding into one trunk BLA. Preferably, the branches are constructed of 10 or 12 gauge wire cable, and trunk BLA wire cables are constructed of 10 or 8 gauge wire cables. One trunk can provide electricity in one direction and one trunk can provide electricity in the other direction.

The cable retention clip (200) can include at least one clip body region (210) defining at least two cable retention channels (212, 214, etc.) that are arranged to have parallel channel axes. Each cable retention channel (212, 214, etc.) has an inlet opening (213, 215, etc.) extending a length of the respective cable retention channel so that each cable retention channel forms a C-shape. Each cable retention channel (212, 214, etc.) can be separated from an adjacent cable retention channel by a cable separator member (225). The cable retention clip (200) can also include at least two elongate resilient pillars (205, 207) that are spaced apart with a gap (209) therebetween. The elongate resilient pillars (205, 207) extend from the clip body region (210) that has the cable retention channels (212, 214, etc.). Each elongate pillar includes a hook (204, 206) at an end that is opposite of the clip body region (210). Each hook (204, 206) can be oriented away from the other hook, such that both hooks point away from each other (e.g., outwardly or lateral to the longitudinal axis of each channel). In some aspects, each cable retention channel (212, 214, etc.) has the same size, such as diameter, circumference, lumen cross-sectional area, or the like. In some aspects, there are four cable retention channels (212, 214, 220, 222) that have the same size. In some aspects, there are six cable retention channels (212, 214, 216, 218, 220, 222) that have the same size.

In some embodiments, the cable retention clip (200) includes the clip body that defines at least a pair of the cable retention channels (212, 214) forming a ω-shape. In some aspects, the inlet openings (213, 215, etc.) of the cable retention channels can open towards the elongate resilient pillars (205, 207). In other aspects, the inlet openings of the cable retention channels open away from elongate resilient pillars.

In some embodiments, the pillars (205, 207) are a same material as the retention clip body (210) and are integrated therewith. The hook (204, 206) of each pillar (205, 207) can include a first hook body portion with a first retention surface (254, 256) extending from a pillar end (270) of the respective pillar, and include a second hook body portion with a second retention surface (250, 252) extending from an end (272) of the first hook body portion. In some aspects, the first retention surface (254, 256) is at an angle with respect to a pillar surface (262), and the second retention surface (250, 252) is at an angle with respect to the first retention surface (254, 256). In some aspects, the first retention surface (254, 256) is orthogonal with respect to a pillar surface (262), and the second retention surface (250, 252) is orthogonal with respect to the first retention surface so as to be parallel with the pillar surface. In some aspects, at least one of the hooks (204, 206) includes has a tapered second hook body portion (274) that tapers from the end (272) of the first hook body portion to a second hook tip (276). In some aspects, each pillar (205, 207) includes: a hook head (278) having the hook (204, 206); a lower pillar body (280) extending from the at least one clip body region (210); and a recessed pillar body (282) having a recessed surface (260) between the hook head (278) and lower pillar body (280).

In some embodiments, a cable arrangement can include the cable retention clip (200) of one of the embodiments and at least two solar cables (106, 108). Each solar cable (106, 108) can be located in the respective cable retention channel (212, 214, etc.) of the cable retention clip. The cable arrangement can include a plurality of the cable retention clips. The cable arrangement can also include a plurality of different types of cable retention clips (500, 550, 700).

In some embodiments, the cable arrangement can include a second cable retention clip (500) that has a second body (502) defining at least two second cable retention channels (510a, 510b) that are arranged to have parallel channel axes. Each second cable retention channel (510a, 510b) has an inlet opening (518a, 518b) extending a length of the respective second cable retention channel so that each second cable retention channel forms a C-shape. Each second cable retention channel (510a, 510b) can be separated from an adjacent second cable retention channel by a second cable separator (519). In some aspects, the second body (502) defines at least a pair of the second cable retention channels forming a ω-shape.

In some embodiments, the cable arrangement can include a second cable retention clip (550) that has a second body that defines at least four second cable retention channels (510a, 510b) with at least two pairs of the at least four second cable retention channels being separated by a branched cable separator (529). The branched cable separator (529) can have a first branch (529a) that forms a first arm of a first pair of second cable retention channels forming the ω-shape. The branched cable separator also has a second branch (529a) that forms a second arm of a second pair of second cable retention channels forming the ω-shape. The cable retention channels are arranged to have the parallel channel axes.

In some embodiments, the cable arrangement can include a second cable retention clip (900) that has a second body (910) that defines at least four second cable retention channels (912, 914, 916, 918) with each second cable retention channel being separated by a second cable separator (919). Two second cable separators have a pair of curved arms and form a first pair of second cable retention channels with one second cable separator having a stubbed central protrusion thereby forming the ω-shape. The at least four second cable retention channels (912, 914, 916, 918) are arranged to have the parallel channel axes. In some aspects, at least one of the second cable retention channels (918) includes a larger size than at least three of the second cable retention channels (912, 914, 916) that have a same smaller size. In some aspects, the outer second cable retention channels (912, 918) form hook shapes that hook toward each other.

In some embodiments, a solar installation includes the cable arrangement of one of the embodiment and at least one solar panel (17) operably coupled with at least one of the solar cables.

In some embodiments, a kit can include at least one cable retention clip of one of the embodiments and at least one second cable retention clip. The second cable retention clip can include a plurality of cable channel conduits. Also, the second cable retention clip can be devoid of a structure coupling feature.

In some embodiments, a method of arranging solar cables is provided. The method of arranging solar cables can include providing the cable retention clip (200) of one of the embodiments. The method can include applying a force to each hook (204, 206) to press the hooks toward each other and then inserting each hook through an aperture (203) in a structural support (202). The force can be released from each hook (204, 206) so that the hooks resiliently spread away from each other and hook into the aperture (203) and couple with the structural support (202). The method can also include inserting at least two cables (106, 108) into at least two cable retention channels. This method results in the cable arrangement, and results in the solar installation when coupled with the solar panel.

The terms and words used in this description and claims are not limited to the bibliographical meanings, but, are merely used to enable a clear and consistent understanding of the disclosure. It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors are known to those skilled in the art, may occur in amounts that do not preclude the effect the characteristic was intended to provide.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, compounds, or materials, which can, of course, vary. It is also to be understood that the terminology used herein is for the purpose of describing particular embodiments only and is not intended to be limiting.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

The invention claimed is:

1. A cable retention clip comprising:

at least one clip body region defining at least two cable retention channels that are arranged to have parallel channel axes, each cable retention channel has an inlet opening extending a length of the respective cable retention channel so that each cable retention channel forms a C-shape, each cable retention channel being separated from an adjacent cable retention channel by a cable separator; and two elongate resilient pillars that are spaced apart with a gap therebetween and that extend from the at least one clip body region, each elongate pillar including a hook at an end opposite of the at least one clip body region, each hook being oriented and extending away from the other hook, wherein:

the hooks of the elongate pillars are located in their entireties to one side of a reference plane that intersects each of the elongate pillars and that is parallel to lengths of the cable retention channels;

the at least one clip body region and the at least two cable retention channels are located in their entireties to an opposite side of the reference plane from the hooks;

the inlet openings of the at least two cable retention channels open towards the elongate resilient pillars; and a diameter of each inlet opening is less than an internal diameter of the corresponding cable retention channel.

2. The cable retention clip of claim 1, wherein the at least two cable retention channels have the same size.

3. The cable retention clip of claim 1, wherein there are four cable retention channels having the same size.

4. The cable retention clip of claim 1, wherein there are six cable retention channels having the same size.

5. The cable retention clip of claim 1, wherein the at least one clip body defines at least a pair of the cable retention channels forming a ω-shape.

6. The cable retention clip of claim 1, wherein the pillars are a same material as the at least one clip body region and integrated therewith.

7. The cable retention clip of claim 1, wherein the hook of each pillar includes a first hook body portion with a first retention surface extending from a pillar end of the respective pillar, and a second hook body portion with a second retention surface extending from an end of the first hook body portion.

8. The cable retention clip of claim 7, wherein the first retention surface is at an angle with respect to a pillar surface, and the second retention surface is at an angle with respect to the first retention surface.

9. The cable retention clip of claim 7, wherein the first retention surface is orthogonal with respect to a pillar surface, and the second retention surface is orthogonal with respect to the first retention surface so as to be parallel with the pillar surface.

10. The cable retention clip of claim 7, wherein at least one of the hooks has a tapered second hook body portion that tapers from the end of the first hook body portion to a second hook tip.

11. The cable retention clip of claim 1, wherein each pillar includes:

a hook head having the hook;

a lower pillar body extending from the at least one clip body region; and a recessed pillar body having a recessed surface between the hook head and lower pillar body.

12. A cable arrangement comprising:

the cable retention clip of claim 1; and at least two solar cables, each solar cable being located in the respective cable retention channel of the cable retention clip.

13. The cable arrangement of claim 12, further comprising a second cable retention clip having a second body defining at least two second cable retention channels that are arranged to have parallel channel axes, each second cable retention channel has an inlet opening extending a length of the respective second cable retention channel so that each second cable retention channel forms a C-shape, each second cable retention channel being separated from an adjacent second cable retention channel by a second cable separator, wherein the second body defines at least a pair of the second cable retention channels forming a ω-shape.

14. The cable arrangement of claim 13, wherein:

the second body defines at least four second cable retention channels with at least two pairs of the at least four second cable retention channels being separated by a branched cable separator, the branched cable separator having a first branch that forms a first arm of a first pair of second cable retention channels forming the ω-shape and having a second branch that forms a second arm of a second pair of second cable retention channels forming the ω-shape, wherein the at least four cable retention channels are arranged to have the parallel channel axes.

15. The cable arrangement of claim 13, wherein:

the second body defines at least four second cable retention channels with each second cable retention channel being separated by a second cable separator, two second cable separators have a pair of curved arms and form a first pair of second cable retention channels with one second cable separator having a stubbed central protrusion thereby forming the ω-shape, wherein the at least four second cable retention channels are arranged to have the parallel channel axes, wherein at least one of the second cable retention channels includes a larger size than at least three of the second cable retention channels that have a same smaller size, wherein outer second cable retention channels form hook shapes that hook toward each other.

16. A solar installation comprising:

a cable arrangement comprising a cable retention clip and at least two solar cables, each solar cable being located in a respective cable retention channel of the cable retention clip, the cable retention clip comprising:

at least one clip body region defining at least two cable retention channels that are arranged to have parallel channel axes, each cable retention channel has an inlet opening extending a length of the respective cable retention channel so that each cable retention channel forms a C-shape, each cable retention channel being separated from an adjacent cable retention channel by a cable separator; and two elongate resilient pillars that are spaced apart with a gap therebetween and that extend from the at least one clip body region, each elongate pillar including a hook at an end opposite of the at least one clip body region, each hook being oriented and extending away from the other hook, the elongate pillars integrally formed with the at least one clip body region as a single component; and at least one solar panel operably coupled with at least one of the two solar cables;

wherein:

the elongate resilient pillars couple the cable retention clip to structure that supports the at least one solar panel to suspend the at least two solar cables beneath the at least one solar panel from the structure;

the at least two cable retention channels are aligned side-by-side in a line that is orthogonal to lengths of the at least two cable retention channels;

the line and the lengths of the at least two cable retention channels define a cable retention plane;

the elongate pillars extend away from and beyond the at least one clip body region, including beyond the at least two cable retention channels, in a direction orthogonal to the cable retention plane; and in a region of the cable retention clip beyond the clip body region, the cable retention clip is devoid of any structure in the gap between the elongate pillars and is devoid of any structure to directly retain any cables.

17. A kit comprising:

a cable retention clip comprising:

at least one clip body region defining at least two cable retention channels that are arranged to have parallel channel axes, each cable retention channel has an inlet opening extending a length of the respective cable retention channel so that each cable retention channel forms a C-shape, each cable retention channel being separated from an adjacent cable retention channel by a cable separator; and two elongate resilient pillars that are spaced apart with a gap therebetween and that extend from the at least one clip body region, each elongate pillar including a hook at an end opposite of the at least one clip body region, each hook being oriented and extending away from the other hook, each of the elongate pillars extending a shorter distance longitudinally than each of the at least two cable retention channels; and at least one second cable retention clip, wherein the second cable retention clip consists of a plurality of cable channel conduits;

wherein:

the at least two cable retention channels are aligned side-by-side in a line that is orthogonal to lengths of the at least two cable retention channels;

the line and the lengths of the at least two cable retention channels define a cable retention plane;

each pillar includes a hook head having the hook, a lower pillar body that extends from the at least one clip body region in a direction orthogonal to the cable retention plane, and a recessed pillar body that extends between the lower pillar body and the hook head in the direction orthogonal to the cable retention plane;

the recessed pillar body of each pillar includes a recessed surface that is recessed relative to a surface of the lower pillar body of the corresponding pillar;

the hook of each pillar includes a first hook body portion with a first planar retention surface extending from a pillar end of the respective pillar, and a second hook body portion with a second planar retention surface extending from an end of the first hook body portion; and the first planar retention surface is orthogonal with respect to a pillar surface, and the second planar retention surface is orthogonal with respect to the first planar retention surface so as to be parallel with the pillar surface.

* * * * *